Feb. 15, 1949.  C. SCHMITTER ET AL  2,462,006
ROTARY JOINT
Filed June 25, 1945

Carl Schmitter
Steven M. Kies
INVENTORS:

BY Ralph W. Moore.
ATTORNEY.

Patented Feb. 15, 1949

2,462,006

UNITED STATES PATENT OFFICE 2,462,006

ROTARY JOINT

Carl Schmitter, West Allis, and Steven M. Kies, Milwaukee, Wis., assignors to The Falk Corporation, Milwaukee, Wis., a corporation of Wisconsin Application June 25, 1945, Serial No. 601,490

4 Claims. (Cl. 285—10)

This invention relates to rotary joints for fluid pressure conductors and particularly for conductors having a plurality of separate fluid passages.

One object of the present invention is to provide a new and improved joint capable of maintaining substantially leakless communication between two fluid conductors during rotation of one conductor relative to the other.

Another object is to provide a new and improved joint capable of maintaining a plurality of fluid conducting channels of one set in individual communication with corresponding channels of another set during rotation of one set relative to the other.

Other more specific objects and advantages will appear, expressed or implied, from the following description of a joint constructed in accordance with the present invention.

The joint selected for illustration is shown applied to a reversing mechanism of the type disclosed in the prior patent to Walter P. Schmitter, No. 2,304,030, for the purpose of conveying fluid pressure to and from the two alternatively operable fluid pressure clutches therein employed, although other uses of the invention are contemplated.

Figure 1:
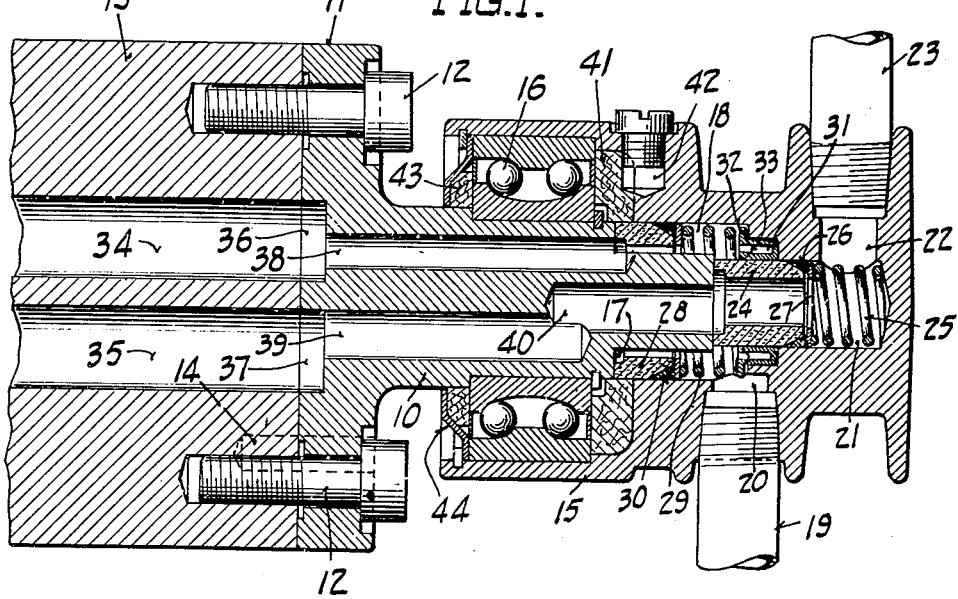
Figure 1 is an axial sectional view of a rotary joint embodying the present invention and shown applied to the end of a rotary fluid conducting shaft.
Figure 2:
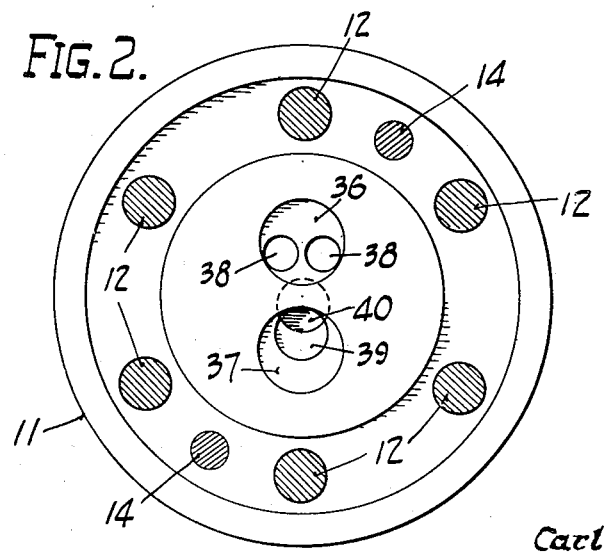
Figure 2 is a view in elevation of the inner end face of the joint.

The joint shown comprises a spindle 10 projecting axially from an integral mounting disk 11 adapted to be secured by bolts 12 or the like to the end face of a fluid conducting shaft 13 for rotation therewith. The disk 11 and spindle 10 are accurately centered with respect to the shaft 13 by suitable means such as a pair of dowels 14.

The spindle 10 projects into and provides support for a non-rotary housing 15 carried by a suitable bearing 16 fixed on the spindle. The end of the spindle is reduced to form a shoulder 17 which constitutes an end wall of an annular chamber 18 contained within the housing. The housing is drilled and tapped to receive a suitable fluid pressure conductor 19 which communicates with the chamber 18 through a port 20.

A second cylindrical chamber 21 formed centrally of and within the end of the housing 15 is provided with a side port 22 through which communication is had with a second fluid pressure conductor 23. Chamber 21 is disposed coaxially of the spindle 10, and a cylindrical sleeve 24 closely fitted therein coacts with the end of the spindle to separate the chambers 18 and 21. The sleeve 24 is preferably of graphite or the like and one end thereof is maintained in sealing contact with the end face of the spindle by a spring 25 contained within the chamber 21. The other end of the sleeve 24 is externally bevelled and encircled by a sealing ring 26 of rubber or the like which is forced into wedging contact with and between the sleeve and the wall of the chamber 21 by the spring 25. A suitable washer 27 is preferably interposed between the ring 26 and spring 25.

One end of the annular chamber 18 is sealed by a sleeve 28 of graphite similar to the sleeve 24 and having one end similarly urged into sealing contact with the shoulder 17 of the spindle 10 by a spring 29 which also functions to compress a sealing ring 30 into contact with and between the sleeve 28 and the wall of the chamber 18. The other end of the chamber 18 is sealed by a conventional U-shaped packing ring 31 confined between the housing and the sleeve 24. In this instance the spring 29 also reacts on a metal ring 32 having a V-shaped circular rib 33 engaged within the packing ring 31 in such manner as to expand the latter into initial contact with the housing and sleeve. The ring 32 is also preferably perforated as indicated so that pressure within the chamber 18 may enter the packing ring 31 to further expand the same.

The shaft 13 in this instance contains two laterally spaced fluid conducting channels 34 and 35 extending lengthwise therethrough and the disk 11 is preferably provided in the face thereof with two recesses 36 and 37 each adapted to register with one of these channels. A pair of channels 38 extending from the recess 36 through the shoulder 17 of the spindle 10 provide communication between the shaft channel 34 and the annular chamber 18. A single channel 39 leading from the recess 37 to a channel 40 which communicates with the interior of the sleeve 24 provides communication between the shaft channel 35 and the cylindrical chamber 21.

From the foregoing it will be noted that the chamber 18 provides permanent communication between one fluid pressure conductor 19 and one of the channels 34 in the shaft 13, while the other chamber 21 provides a separate permanent communication between the other fluid pressure conductor 23 and the other shaft channel 35 during rotation of the shaft and spindle 10 relative to the housing 15.

A thick felt washer 41 saturated with lubricant derived from a suitable reservoir 42 provides adequate lubrication for the sleeve 28, and it cooperates with a second felt washer 43 confined by a suitable retainer ring 44 to effectively exclude dust from the bearing 16.

Various changes may be made in the embodiment of the invention hereinabove specifically described without departing from or sacrificing the advantages of the invention as defined in the appended claims.

We claim:

1. A fluid conducting rotary joint comprising a spindle, a housing in which said spindle is journalled, said housing having two chambers therein concentrically disposed with respect to said spindle, a sleeve slidably seated in one of said chambers and axially urged into sealing contact with said spindle to separate said chambers, separate fluid conducting channels in said spindle each communicating with one of said chambers, and separate fluid conducting ports in said housing each communicating with one of said channels through one of said chambers.

2. A fluid conducting rotary joint comprising a spindle, a housing in which said spindle is journalled, said housing having an annular chamber therein encircling an end of said spindle, said housing also having a second chamber therein beyond the end of said spindle, a sleeve slidably seated in said second chamber and axially urged into sealing contact with said spindle end to separate said chambers, separate fluid conducting channels in said spindle each communicating with one of said chambers, and separate ports in said housing each communicating with one of said channels through one of said chambers.

3. A fluid conducting rotary joint comprising a spindle, a housing in which said spindle is journalled, said housing having an annular chamber encircling an end of said spindle and a second chamber beyond said spindle end, a sleeve slidably fitted in said second chamber and axially urged into sealing contact with said spindle end to separate said chambers, seals for the opposite ends of said annular chamber, one of said seals being in sealing contact with said sleeve, resilient means interposed between and reacting upon both of said seals, a pair of separate channels in said spindle each communicating with one of said chambers, and separate ports in said housing each communicating with one of said chambers.

4. A fluid conducting rotary joint comprising a spindle, a housing in which said spindle is journalled, said housing having inner and outer chambers concentrically disposed with respect to said spindle, a sleeve interposed between and separating said chambers, means urging said sleeve into sealing contact with said spindle, separate ports in said housing, and separate channels in said spindle each communicating with one of said ports through one of said chambers.

CARL SCHMITTER.
STEVEN M. KIES.

REFERENCES CITED

The following references are of record in the file of this patent:

UNITED STATES PATENTS

| Number | Name | Date |
| --- | --- | --- |
| 2,384,281 | Carter | Sept. 4, 1945 |